Jan. 13, 1970  P. R. RININGER ET AL  3,489,212
CONDUCTOR PIPE ALIGNMENT MEANS FOR
USE IN OFFSHORE DRILLING
Filed Jan. 2, 1968  2 Sheets-Sheet 1
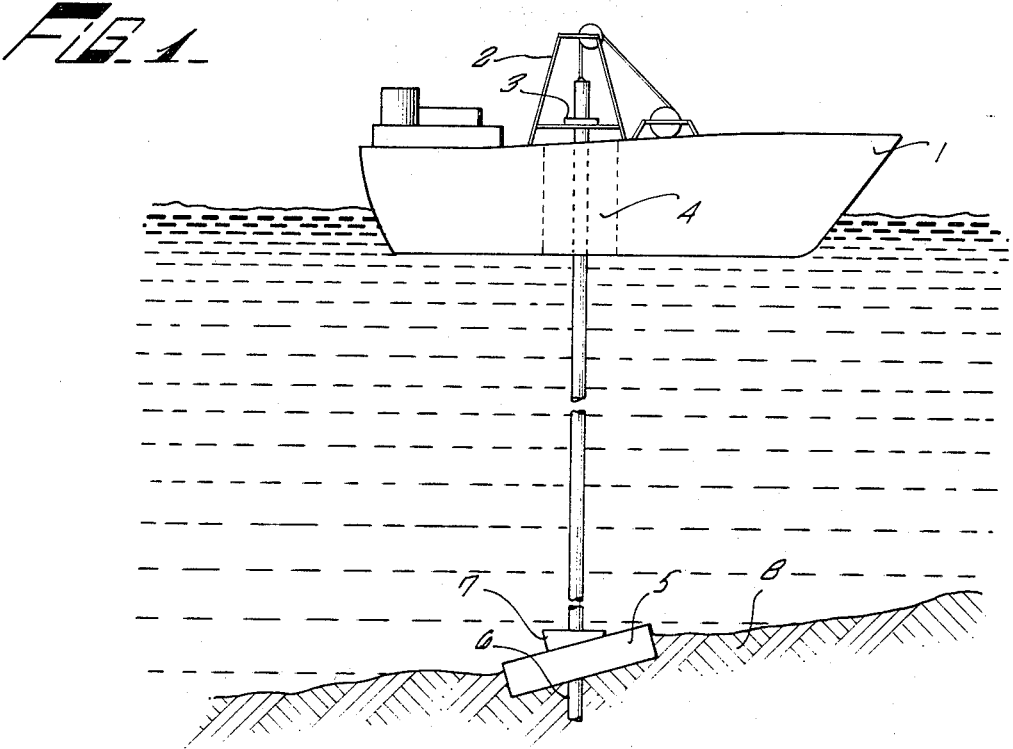
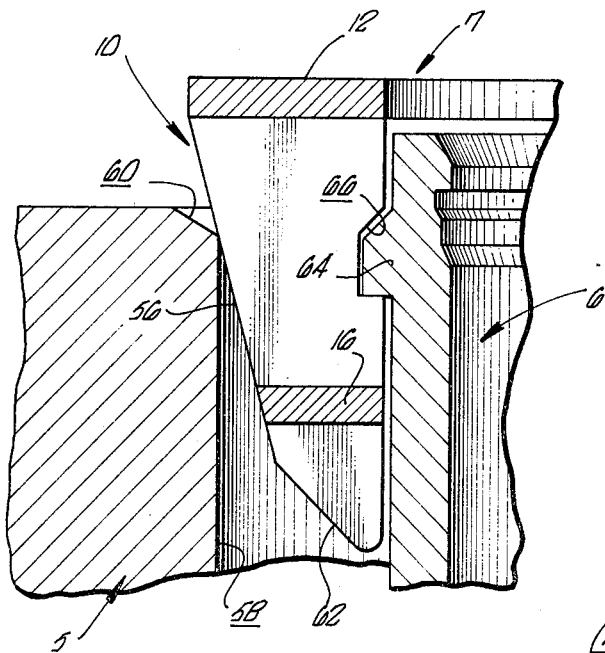
INVENTORS.
PAUL R. RININGER
JAMES W. E. HANES
JOSEPH HENRY HYNES
Christie, Parker & Hale
ATTORNEYS.

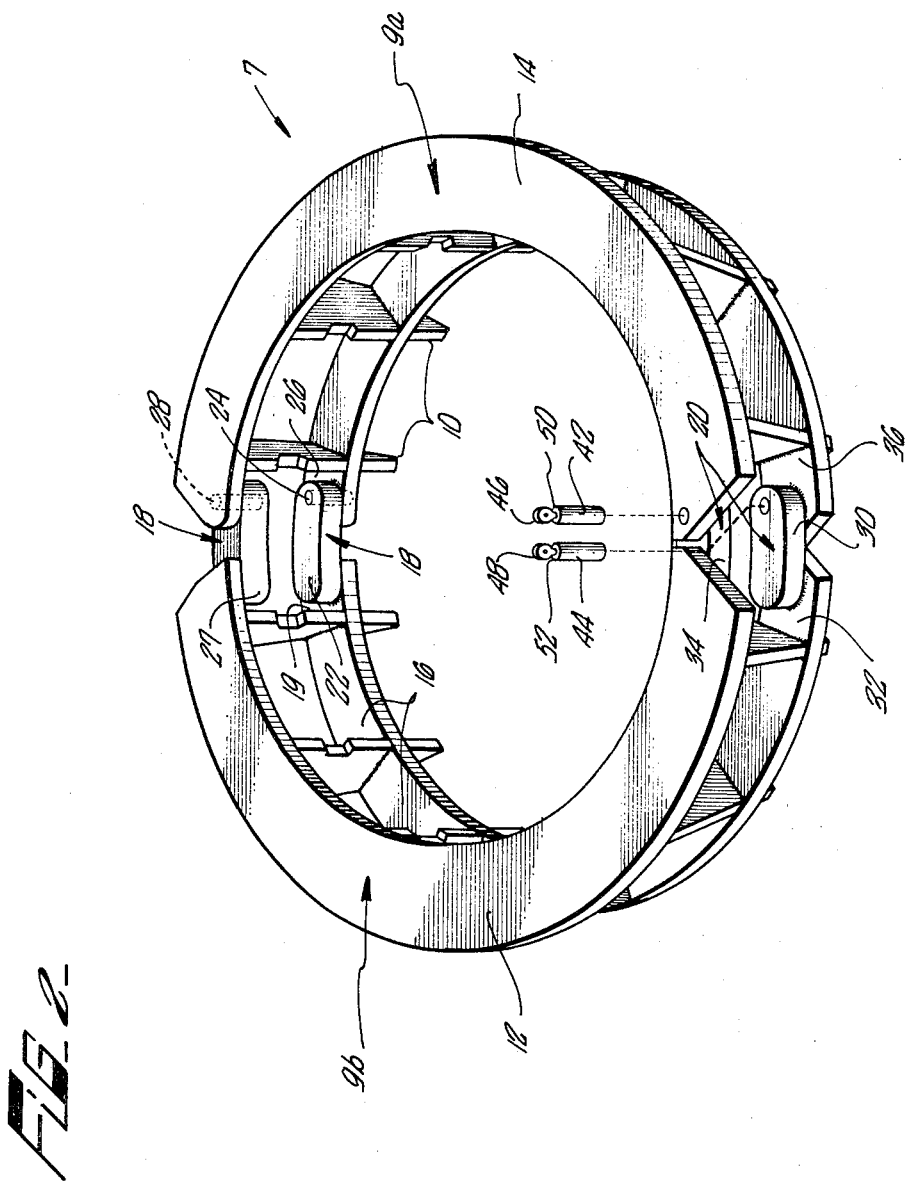

United States Patent Office 3,489,212
Patented Jan. 13, 1970

3,489,212
CONDUCTOR PIPE ALIGNMENT MEANS FOR USE IN OFFSHORE DRILLING
Paul R. Rininger, Woodland Hills, and James W. E. Hanes and Joseph Henry Hynes, Ventura, Calif., assignors to Global Marine Inc., Los Angeles, Calif., a corporation of Delaware
Filed Jan. 2, 1968, Ser. No. 695,184
Int. Cl. E21b 33/035, 17/00
U.S. Cl. 166—.5                                                 7 Claims

ABSTRACT OF THE DISCLOSURE

A surface casing or conductor pipe is supported by a landing base through a self-aligning bushing. The bushing has a plurality of circumferentially disposed and spaced apart support fins. The outer radial surface of each fin is tapered downwardly to provide a self-aligning support edge in contact with the wall of a hole in the landing base. The bushing is secured to the conductor pipe by an annular flange on the pipe which is engaged in notches in the inner surface of the support fins. The bushing is split into two parts which are connected together by hinge and locking pins to allow the bushing to be opened for placement around the conductor pipe.

BACKGROUND OF THE INVENTION

The present invention relates to offshore drilling in general and in particular to an improved means for aligning a surface casing or conductor pipe.

In offshore drilling, a landing or drilling base is employed to support a conductor pipe or surface casing on the floor of the body of water in which a drilling operation is conducted and petroleum production effected. The landing base has an aperture through which the surface casing passes into the well. The floor is rarely horizontal but instead is sloping and uneven. When the landing base is lowered to the floor, typically by guidelines, its aperture or casing passage will be off the vertical if the floor is not horizonal. This vertical misalignment of the casing passage results in alignment difficulties for not only the surface casing but also drilling tools and other casings which must be lowered through the passage. In aggravated cases misalignment may be such that drilling is impossible and the base must be relocated.

In an effort to overcome such alignment difficulties, it has been proposed to employ a ball and socket type connection between the landing base and the surface casing. The landing base has a downwardly tapered socket and the surface casing has an enlarged spherical portion or ball. On the floor, the ball is capable of rotating within the tapered socket to vertically align the surface casing. Because of the bulk and mass of the casing and ball, this alignment technique requires that the ball be rigidly affixed to the casing in order to facilitate handling aboard a drilling vessel or platform.

Frequently, however, drilling operations are conducted through a rotary table. It is desirable to lower as many items as possible through the rotary table in order to take advantage of the lifting equipment available at this location and to avoid hazardous, awkward working conditions.

In many cases the hole in the rotary table has a diameter which is too small to allow the passing of a surface casing having an alignment ball. This means that the surface casing and ball must be lowered to the ocean's floor from below the rotary table requiring drilling personnel to work immediately above the surface of the water. Moreover, because of the weight of the surface casing with its attendant alignment ball, working below the rotary table may be extremely difficult and time consuming.

Moreover, axial alignment is not always assured by the use of the ball and socket type alignment technique. Initially, there must be continuous line contact between the ball and socket for proper alignment. If the ball or socket is damaged there is the possibility of seizure between the two in a nonaligned position. But what is perhaps a more important consideration results from the fact that the drilling base is normally lowered before the surface casing and its spherical enlargement are placed. In the event that debris enters the socket before the casing is placed, it is possible that the debris may lodge between the surface of the ball and the socket preventing proper alignment.

SUMMARY OF THE INVENTION

The present invention provides a wellhead structure which effects proper vertical orientation of a conductor pipe or surface casing on a landing base while avoiding the problems discussed above.

Briefly, the wellhead structure includes an alignment bushing in conjunction with a landing base and surface casing. The bushing is removable from the surface casing or conductor pipe to allow the lowering of the casing through the hole in a rotary drill table and the attachment of the bushing below the table.

The bushing has a plurality of circumferentially disposed and spaced apart support fins each having a tapered outer radial surface. The taper of the fins converges downwardly from a diameter which is larger than the aperture of the landing base to a diameter which is smaller than the aperture of the landing base. The bushing may be opened along its diameter to receive the surface casing and locked together securely about the casing for positioning on the landing base. The tapered surfaces of the fins provide support edges which meet and engage the wall of the aperture in the landing base and allow for the vertical alignment of the surface casing which the bushing carries.

In the presently preferred form, the support fins are rigidly connected together at their tops by a pair of generally semicircular support plates and proximate their bottoms by a plurality of braces. The resulting bushing is in two symmetrical sections which are attached together such that the bushing may be opened for attachment to the surface casing. This is preferably accomplished by connecting the symmetrical sections together through a hinge and a releasable lock. The hinge and lock are at opposite diametrical positions. When the lock is released, the symmetrical sections may be opened for receiving the surface casing. The hinge connection may be provided by a pair of heavy links rigidly attached at one of the diametrical positions to one of the sections and pivotally attached to the other section through dowel pins. The locking of the two sections together may also be accomplished through links rigidly attached to one section and extending across to the complementary section. The lock is secured by locking pins received in holes in the links and the complementary section of the bushing.

It is also preferred to have a second tapered edge below the supporting taper on each of the fins. The first taper provides for alignment of the bushing and its carried surface casing in the landing base while the second taper provides a guide to aid in the placement of the bushing in the aperture in the base. The guide tapers are therefore tapered more severely than the support tapers.

The bushing is preferably coupled to the surface casing by providing an annular flange around the casing and notches or grooves in the inner edges of the support fins. The notches or grooves receive the annular flange when the bushing is locked in place around the surface casing.

The present invention provides an alignment bushing which is relatively light in construction and therefore relatively easy to install on a conductor pipe or surface casing. The bushing is removable from the casing allowing the casing to pass through the limited diameter hole in a rotary drill table and the bushing affixed below the table. This overcomes the problem of lowering an integral casing and ball type alignment bearing previously contemplated and allows the passage of the casing through the table. Moreover, the fact that a plurality of spaced apart support fins are used to provide alignment reduces the mass of alignment bushing over a ball type of the same size. This facilitates the handling of the bushing before it is lowered onto the landing base. The space left between proximate support fins provides room for debris which may be lodged in the aperture of the landing base and therefore avoids the problem of having the debris prevent proper alignment. The limited contact between the fins and the wall of the aperture in the landing base also helps in proper alignment because it reduces the possibility of seizure between the bushing and the landing base which could be produced if either of the contacting surfaces were damaged.

These and other features, aspects and advantages of the present invention will become more apparent from the following description, appended claims and drawings.

BRIEF DESCRIPTION OF THE FIGURES

FIGURE 1 is a schematic depiction of a wellhead structure including a landing base, surface casing and alignment bushing, together with a drilling vessel to illustrate the present invention;

FIGURE 2 is a perspective view looking downwardly at the improved alignment bushing of the present invention; and FIGURE 3 is a fragmentary view showing the relationship between the support fins, surface casing and landing base of the present invention.

DESCRIPTION OF THE PREFERRED EMBODIMENTS

FIGURE 1 illustrates schematically in abbreviated fashion a typical offshore drilling operation. A support ship 1 has a derrick 2 and a rotary drilling table 3. On the platform that supports the drilling table as much of the drilling and production equipment as is possible is positioned for lowering through the drilling table. Below drilling table 3 is a moon pool 4 above which those items which are too large to pass through the table must be handled and lowered to the drilling or production location. The wellhead structure at the drilling location includes a landing base 5, a surface casing 6 and an alignment bushing 7. Base 5 is provided to support surface casing or conductor pipe 6. Alignment bushing 7 is provided to insure that surface casing 6 is vertically oriented notwithstanding the position of landing base 5 on a sloped ocean floor 8. The surface casing and alignment bushing are rigidly coupled together in this submerged location.

Landing base 5 as well as surface casing 6 are of standard form and will not be described in detail here except insofar as they relate to alignment bushing 7. Thus, landing base 5 may be a concrete structure or a large, metal frame-like structure often employed in offshore drilling operations. In any event, landing base 5 is normally lowered and guided by guidelines from support vessel 1 to its position on the floor of the body of water under which a well is to be drilled. The landing base has an aperture or passage for receipt of the alignment bushing and surface casing. This aperture is often vertically misaligned necessitating some means to insure that surface casing 6 is maintained in a vertical orientation.

FIGURES 2 and 3 depict the alignment bushing of the present invention which insures the proper vertical orientation of surface casing 6. With specific reference to FIGURE 2, alignment bushing 7 is in two symmetrical sections 9a and 9b. Each section includes a plurality of spaced apart and circumferentially disposed support fins 10. These fins are attached at their tops to a pair of generally semicircular connecting plates 12 and 14 of sections 9b and 9a, respectively. Ribs or braces 16 are attached between adjacent fins to provide further strength.

The two symmetrical sections of bushing 7 are joined together by hinges 18 and locks 20. Hinges 18 include a link member 22 which is affixed, as by welding, to section 9b of the bushing on a mounting member 19 and connected to section 9a through a dowel pin 24. Dowel pin 24 is secured to a lower mounting member 26. Both of these mounting members are attached to a fin as illustrated. The upper of hinges 18 also includes a link member 27 which is welded to semicircular plate 12 and connected through a dowel pin 28 to semicircular plate 14. The proximate edges of plates 12 and 14 adjacent hinges 18 define a generally V-shaped space to allow the bushing to open for receiving surface casing 6. To the same end, mounting members 19 and 26 are separated by a V-shaped space.

Locks 20 include a link member 30 welded to a mounting member 32 and an upper link member 34 welded to semicircular plate 12. Mounting member 32 is welded to its most proximate fin in section 9b. Link 30 extends over a mounting member 36 which is welded to its most proximate fin in section 9a. Link 34 extends under semicircular plate 14. Holes are provided through each of the links, semicircular plate 14 and mounting member 36. When in register, these holes accept locking pins 42 and 44 to secure the bushing together. For ease of handling, each of the locking pins has an eye 46 and 48. Flanges 50 and 52 are provided on pins 42 and 44 for bearing on the surface surrounding the hole of semicircular plate 14 and link 30, respectively.

FIGURE 3 depicts the configuration of supporting fins 10. Each fin has a supporting surface 56 for engaging the landing base which is tapered from the fin's top to its bottom, that is, the taper of surface 56 converges towards the bottom of bushing 7. The upper portion of surface 56 has a radial distance from the center of bushing 7 which is in excess of the radius of aperture 58 in landing base 5. The lower portion of surface 56 has a radius measured from the axial center of bushing 7 which is smaller than the radius of aperture 58. Thus, when bushing 7 is inserted in aperture 58, it will bear along a line defined by intersection of the fins with the upper circumferential terminus of the wall of the aperture. To facilitate the entrance of bushing 7 into aperture 58, an annular counterbore 60 is provided at the mouth of the aperture. Registration of bushing 7 in aperture 58 is further enhanced by a leading or guide surface 62 at the bottom of each of the fins. This leading surface has a taper which converges towards the bottom of the bushing considerably more dramatically than the taper of surface 56.

Bushing 7 engages conductor pipe or surface casing 6. As seen in FIGURE 3, engagement is provided through an annular flange 64 about the outer circumference of surface casing 6. A mating notch 66 is provided in each of the fins and receives flange 64 when bushing 7 is locked in place.

In operation, surface casing 6 is lowered through the hole in rotary table 3 and held below the table. Bushing 7 is then mounted on the surface casing. Mounting is accomplished by removing pins 42 and 44 and pivoting symmetrical sections 9a and 9b away from each other about dowel pins 24 and 28. The open bushing is then placed around the surface casing 6 in a position for engaging flange 64 in each of the grooves 66 of fins 10. The bushing is then secured by bringing the sections together and locking them with pins 42 and 44. The conductor and bushing are then lowered along guidelines to the ocean's floor and landing base 5. The bushing will register in aperture 58 of the base with the aid of leading edges 62. In the event that the landing base is off the horizontal, the bushing will nonetheless align surface casing 6 in its proper vertical orientation by sliding into a seated, horizontal position along support surfaces 56 so long as the landing base's departure from the horizontal is not so great as to prevent bushing 7 entering aperture 58. If the landing base's departure from the horizontal is not so great as to prevent bushing 7 from entering aperture 58 but too large to prevent a sufficient number of the fins of the bushing from engaging the landing base to ensure stability, then bushing 7 will not be in a horizontal attitude when it reaches equilibrium with the landing base. In the seated position there will be contact between each of the fins 10 and the upper terminus of the wall of aperture 58 which in aggregate define a locus of contact lines falling in a circle.

The present invention has been described with reference to a certain preferred embodiment. The spirit and scope of the appended claims should not, however, necessarily be limited by this detailed description.

What is claimed is:

1. For use in a wellhead structure in offshore drilling, the wellhead structure including a landing base adapted to rest on the floor of a body of water, the base having a generally cylindrical aperture therethrough; a surface casing; and means for effecting proper vertical orientation of the surface casing, an improvement in the orientation means which comprises:

an alignment bushing adapted to be demountably secured to the surface casing, the bushing having a plurality of radially disposed and circumferentially spaced apart alignment fins around its outer periphery, each fin having a tapered outer support surface with the taper converging from a point of maximum radius towards the bottom of the bushing to a point of minimum radius, the radius of the cylindrical aperture in the base being smaller than the maximum radius of the tapered outer surfaces but larger than the minimum radius of the tapered outer surfaces such that the tapered outer surfaces of the fins are capable of contact with the upper terminus of the wall of the aperture to support the surface casing therein in a vertical position notwithstanding a nonvertical attitude of the aperture.

2. The wellhead structure claimed in claim 1 wherein:

the alignment bushing is divided into two symmetrical sections; and including means to secure the first and second sections together around the surface casing.

3. The wellhead structure claimed in claim 2 wherein:

each of the fins has a tapered, leading edge at its bottom converging towards the bottom of the bushing with a greater degree of taper than the support surface.

4. The wellhead structure claimed in claim 3 wherein the securing means includes:
   (a) hinge means joining the first and second sections together at one point; and
   (b) releasable lock means operable to join the first and second sections together at a point diametrically opposite the hinge means.

5. The wellhead structure claimed in claim 4 wherein:
   (a) the surface casing includes an annular flange; and
   (b) the inner portion of each of the fins includes a groove in engagement with the flange.

6. The wellhead structure claimed in claim 5 wherein the first and second section each includes:
   (a) a semicircular support plate secured to the top of the section's fins, and
   (b) lower support braces secured between each of the section's fins below the support plate and above the leading edges of the fins.

7. The wellhead structure claimed in claim 6 wherein:
   (a) the hinge means include:
      (i) an upper link secured to the first section's support plate and pivotally connected to the second support plate, and
      (ii) a lower link spaced below the upper link and secured to the first section, the lower link being pivotally connected to the second section; and
   (b) the lock means include:
      (i) an upper link secured to one of the support plates and extendible to the other support plate and a first locking pin operable to be received in a pair of registrable holes in such link and other support plate, and
      (ii) a lower link secured to one of the sections and extendible to the other section and a second locking pin operable to be received in a pair of registrable holes in such link and other section.

References Cited

UNITED STATES PATENTS

| | | | |
|---|---|---|---|
| 3,143,172 | 8/1964 | Wakefield | 166—.5 |
| 3,292,694 | 12/1966 | Lacy et al. | 166—.5 |
| 3,310,107 | 3/1967 | Yancey | 166—.6 |
| 3,338,305 | 8/1967 | Pittman et al. | 166—.5 X |
| 3,398,790 | 8/1968 | Wakefield | 166—.5 |

CHARLES E. O'CONNELL, Primary Examiner

RICHARD E. FAVREAU, Assistant Examiner